United States Patent [19]
Lin et al.

[11] Patent Number: 6,016,354
[45] Date of Patent: Jan. 18, 2000

[54] APPARATUS AND A METHOD FOR REDUCING RED-EYE IN A DIGITAL IMAGE

[75] Inventors: Qian Lin, Santa Clara; Daniel R. Tretter, Mountain View; Konstantinos Konstantinides, San Jose; Andrew Patti, Sunnyvale, all of Calif.

[73] Assignee: Hewlett-Packard Company, Palo Alto, Calif.

[21] Appl. No.: 08/956,380

[22] Filed: Oct. 23, 1997

[51] Int. Cl.$^7$ ........................................................ G06K 9/00
[52] U.S. Cl. ........................... 382/117; 382/115; 382/162; 382/164; 382/167; 382/168; 382/169; 382/171; 382/172; 358/518; 358/527
[58] Field of Search .................................... 382/117, 115, 382/167, 162, 164, 168, 169, 171, 172; 358/500, 520, 527, 518

[56] References Cited

U.S. PATENT DOCUMENTS

| | | | |
|---|---|---|---|
| 5,130,789 | 7/1992 | Dobbs et al. | 358/75 |
| 5,231,674 | 7/1993 | Cleveland et al. | 382/49 |
| 5,324,940 | 6/1994 | Ekstrom | 250/302 |
| 5,448,381 | 9/1995 | Bohan et al. | 358/500 |
| 5,748,764 | 5/1998 | Benati et al. | 382/169 |
| 5,801,808 | 9/1998 | Abraham et al. | 351/246 |

OTHER PUBLICATIONS

Sahoo et al., "A Survey of Thresholding Techniques", 1988, vol. 41, pp. 233–260, Computer Vision, Graphics, and Image Processing, Copyright 1988 by Academic Press, Inc.

Duda et al., "Use of the Hough Transformation to Detect Lines and Curves in Pictures", 1972, vol. 15 (1), pp. 11–15, Communications of the ACM, W. Newman (ed.).

Sung et al., "A Video Eye Tracking System Based on a Statistical Algorithm", pp. 438–411, Dept. of Electrical Eng. & Computer Science, The Univesity of Michigan, Ann Arbor, MI.

*Primary Examiner*—Christopher S. Kelley
*Assistant Examiner*—Sheela Chawan
*Attorney, Agent, or Firm*—Thomas X. Li

[57] ABSTRACT

A red-eye reduction system is described that includes a masking module. The masking module converts an image into a mask having first state areas representing red color pixels of the image and second state areas representing other color pixels of the image. The image includes an eye with a red pupil. A pupil locating module is coupled to the masking module to locate a substantially first state area in the mask that resembles a pupil. A color replacing module is then coupled to the pupil locating module to change the red color pixels in the area into monochrome (grey) or other pre-defined colors. The color replacing module also adjusts the boundary of the area by changing the colors of pixels in close proximity to the area if the color of these pixels is determined to be sufficiently close to red such that natural appearance of the eye is maintained when reducing the red pupil. A method of reducing red-eye effect in a digital image is also described.

11 Claims, 10 Drawing Sheets

BINARY MASK

APPARATUS AND A METHOD FOR REDUCING RED-EYE IN A DIGITAL IMAGE

BACKGROUND OF THE INVENTION

1. Field of the Invention

The present invention pertains to digital image processing. More particularly, this invention relates to automatically reducing red-eye in a digital image while maintaining the natural appearance of the eyes.

2. Description of the Related Art

As is known, photographing a person in a relatively dark environment requires flashlight to avoid under-exposure. The use of flashlight, however, often results in a person's eyes being red in the photograph, making the person look "spooky" or unnatural in the photograph. This is typically referred to as the "red-eye" phenomenon or simply red-eye.

The red-eye typically results from the person's pupils not being able to quickly adjust to the flashlight in darkness. As is known, the pupils of a person are enlarged in a dark environment. When flashlight appears, the pupils are not able to reduce their sizes due to the suddenness of the flashlight. This typically causes the flashlight reflecting off the retina at the back of the eyes, causing red-eye.

Several prior art techniques have been proposed to reduce the red-eye effect. A common prior art approach is to use multiple flashes in the camera to contract the pupils before a final flash is used to expose and capture the image. However, disadvantages are associated with this prior art approach. One disadvantage is the delay between the time when the first flashlight appears and the time when the picture is actually taken. This means the picture is taken several seconds after the exposure button has been pressed. This may cause confusion and the subjects may move away from the posed positions before the image is captured. Moreover, the red-eye problem still occurs when the user forgets to enable this feature of the camera during photographing, or when the camera is not equipped with such red-eye prevention feature. Further, this prior art approach cannot solve the red-eye problem in the already-taken photos.

With the advance of image processing technologies, it is now possible to digitize an image and store the digitized image in a computer system. This is typically done either using a digital camera to capture the image digitally, or using a scanner that converts the image into digital form. The digital image includes data representing image pixels arranged in a matrix. The data of the digital image are then stored in the computer. The digital image can be retrieved for display and can also be digitally altered in the computer.

Because images can now be captured as or converted into digital images, it is thus possible to correct the red-eye problem in an image digitally. Some prior art schemes have been proposed to correct the red-eye problem digitally. One such prior art scheme simply provides the user with means for manually painting over the red eyes digitally. The disadvantage of this prior art scheme is that some kind of painting skill is needed for the user to paint over the red eyes. Another disadvantage is that the correction of the red-eye is not done automatically, but rather manually.

Another prior art approach requires the user to precisely locate the center of a pupil so that a black circle is placed over the red-eye region. The disadvantage of this prior art approach is that the red-eye region is often not a circular region. This may cause portions of the red-eye region not to be covered by the black circle. In addition, the black circle may not be able to cover the peripheral area (i.e., the pink ring) of the red-eye region. Moreover, replacing the red pupil with a complete black circle may also cover the glint in the pupil. As is known, the glint in the pupil is usually a bright "white" spot. Thus, the result of this type of correction is often quite noticeable and undesirable, and sometimes destroys the natural appearance of the eyes in the image.

SUMMARY OF THE INVENTION

One feature of the present invention is to reduce red-eye in a digital image.

Another feature of the present invention is to automatically reduce redeye in an image with minimal user intervention.

A further feature of the present invention is to reduce red-eye in an image while preserving the natural appearance of the eyes.

A still further feature of the present invention is to provide a robust and user-friendly arrangement for correcting red-eye.

A red-eye reduction system is described which includes a masking module. The masking module converts an image into a mask having first state regions representing red color pixels of the image and second state regions representing other color pixels of the image. The image includes an eye with a red pupil. A pupil locating module is coupled to the masking module to locate a substantially first state area in the mask that resembles a pupil. A color replacing module is coupled to the pupil locating module to change red color pixels in the area into monochrome (grey) or other pre-defined colors. The color replacing module also adjusts the boundary of the area by changing the colors of pixels in close proximity to the area if the color of these pixels is determined to be sufficiently close to red.

A method of reducing red-eye in a digital image is described. The method includes the step of converting an image having an eye with a red pupil into a mask having first state areas representing red color pixels of the image and second state areas representing other color pixels of the image. The mask is then processed to locate a substantially first state area in the mask that resembles a pupil. The method then changes the red color pixels in the area into monochrome (grey) or other predefined colors with boundary adjustments when the color of pixels in close proximity to the area is determined to be sufficiently close to red.

Other features and advantages of the present invention will become apparent from the following detailed description, taken in conjunction with the accompanying drawings, illustrating by way of example the principles of the invention.

DETAILED DESCRIPTION OF THE INVENTION

Figure 1:
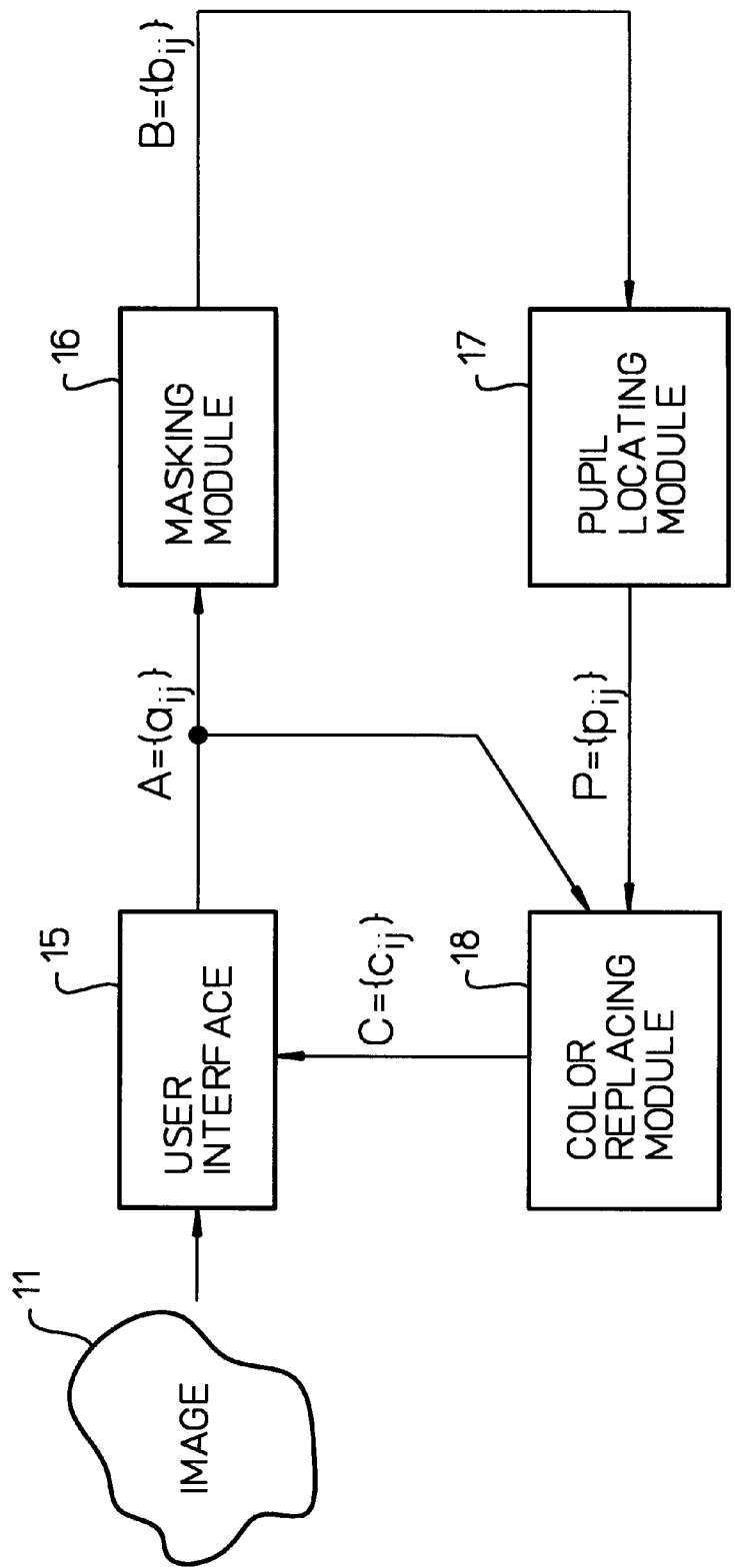
FIG. 1 shows a red-eye reduction system that implements one embodiment of the present invention, wherein the red-eye reduction system includes a user interface, a masking module, a pupil locating module, and a color replacing module.

FIG. 1 shows a red-eye reduction system 10 that implements one embodiment of the present invention. In accordance with one embodiment of the present invention, the red-eye reduction system 10 reduces or minimizes red-eye in an image once the user has marked the area within which a red pupil is located. The red-eye reduction system 10 then automatically reduces the red-eye while maintaining the natural appearance of the eye.

As will be described in more detail below, the red-eye reduction system 10 includes a user interface 15 that allows the user of the red-eye reduction system 10 to mark or define an area to be processed by the red-eye reduction system 10 to reduce the red-eye effect. The area contains a red pupil. In addition, the red-eye reduction system 10 includes a masking module 16 that converts the marked area containing the red pupil into a binary mask of first state (e.g., white) areas and second state (e.g., black) areas. The "white" areas of the binary mask represent the red color pixels within the marked area of the image. The "black" areas represent other color pixels within the marked area of the image.

The red-eye reduction system 10 also includes a pupil locating module 17 that locates a substantially "white" area in the binary mask that resembles a pupil. The red-eye reduction system 10 further includes a color replacing module 18 that only changes the red color pixels in the area into monochrome (grey) or other predefined colors. This maintains the glint in the pupil which is typically a bright non-red spot. In addition, the color replacing module 18 also adjusts the boundary of the area by changing colors of pixels in close proximity of the area to monochrome (grey) or other predefined colors if the color of those pixels is determined to be sufficiently close red. The red-eye reduction system 10 will be described in more detail below, also in conjunction with FIGS. 1 through 10.

The red-eye reduction system 10 can be implemented by software, hardware, or firmware. This means each of the modules 15–18 can be implemented by software, hardware, or firmware. In one embodiment, the red-eye reduction system 10 is a software application program that is run on a computer system (not shown). The computer system that runs the red-eye reduction system 10 can be a personal computer, a mini computer, a workstation computer, a notebook computer, a network computer, a server computer, or any other data processing system. Alternatively, one or more modules of the red-eye reduction system 10 can be implemented by hardware or firmware while others can still be software modules.

Moreover, the red-eye reduction system 10 can be implemented in an imaging system (not shown). The imaging system can be an image display system, a scan-to-print system, or simply a computer system having a display. The imaging system can also be other type of imaging system.

As is shown in FIG. 1, the user interface 15 of the red-eye reduction system 10 is used to display an original image 11.

Figure 3:
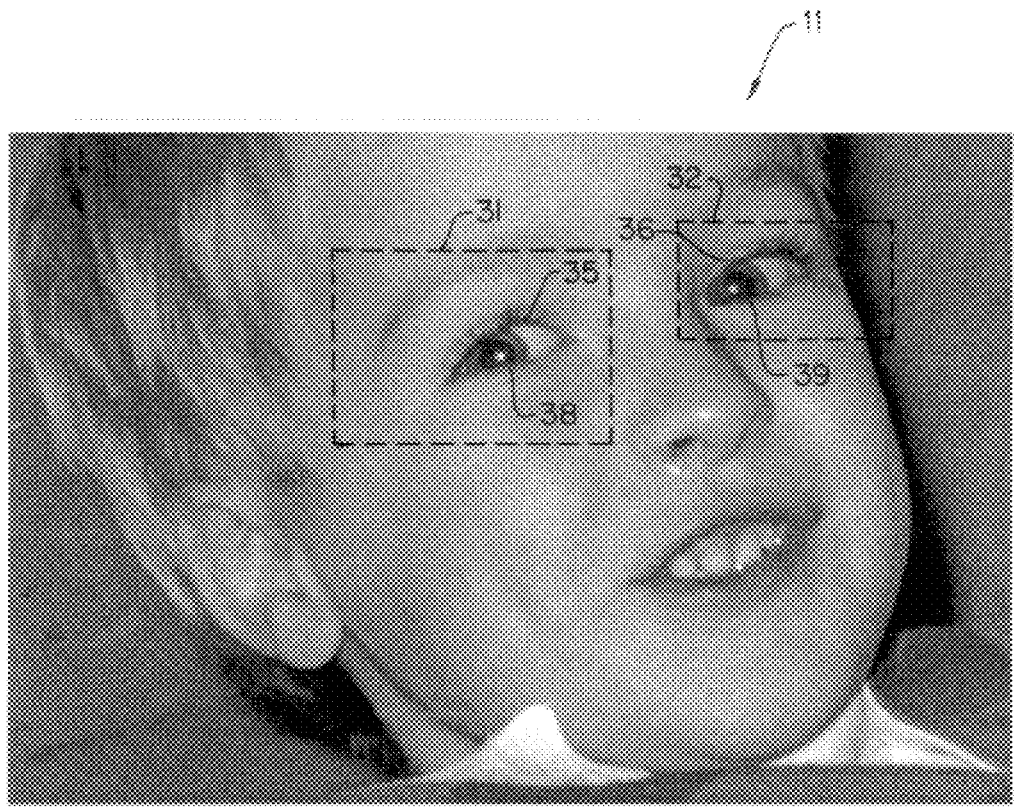
FIG. 3 shows an image displayed by the user interface with user defined areas that contain red eyes.

The original image 11 has red eyes or red pupils. FIG. 3 shows one such image, as an example. As can be seen from FIG. 3, each of the eyes 35–36 has a pupil (i.e., pupil 38 or 39) that is red. FIG. 3 also shows two marked or defined areas 31 and 32. In one embodiment, the marked areas 31–32 are marked by the user through the user interface 15. The marked areas 31–32 will be described in more detail below.

As can be seen from FIG. 3, each of the marked areas 31–32 is a rectangular region that surrounds a red pupil (e.g., the pupil 38 or 39) which is to be recolored to a neutral dark). It is, however, to be noted that the marked area (31 or 32) need not be rectangular, but may be, in general, a polygon or have a curvilinear shape. The rectangular shape is shown merely as an example. The image within the marked area (e.g., the marked area 31 or 32) is represented as A=$\{a_{ij}\}$, wherein $a_{ij}$ represents a pixel within the image A.

Referring back to FIG. 1, the original image 11 is a digital image which can be obtained from an image capturing device. Known technologies are used to obtain the original image 11. For example, the original image 11 can be produced by a scanner or a digital camera, and is directed to be displayed by a display (e.g., CRT, LCD, or flat panel display). Alternatively, the original image 11 may be directed to be printed by a printer.

Figure 2:
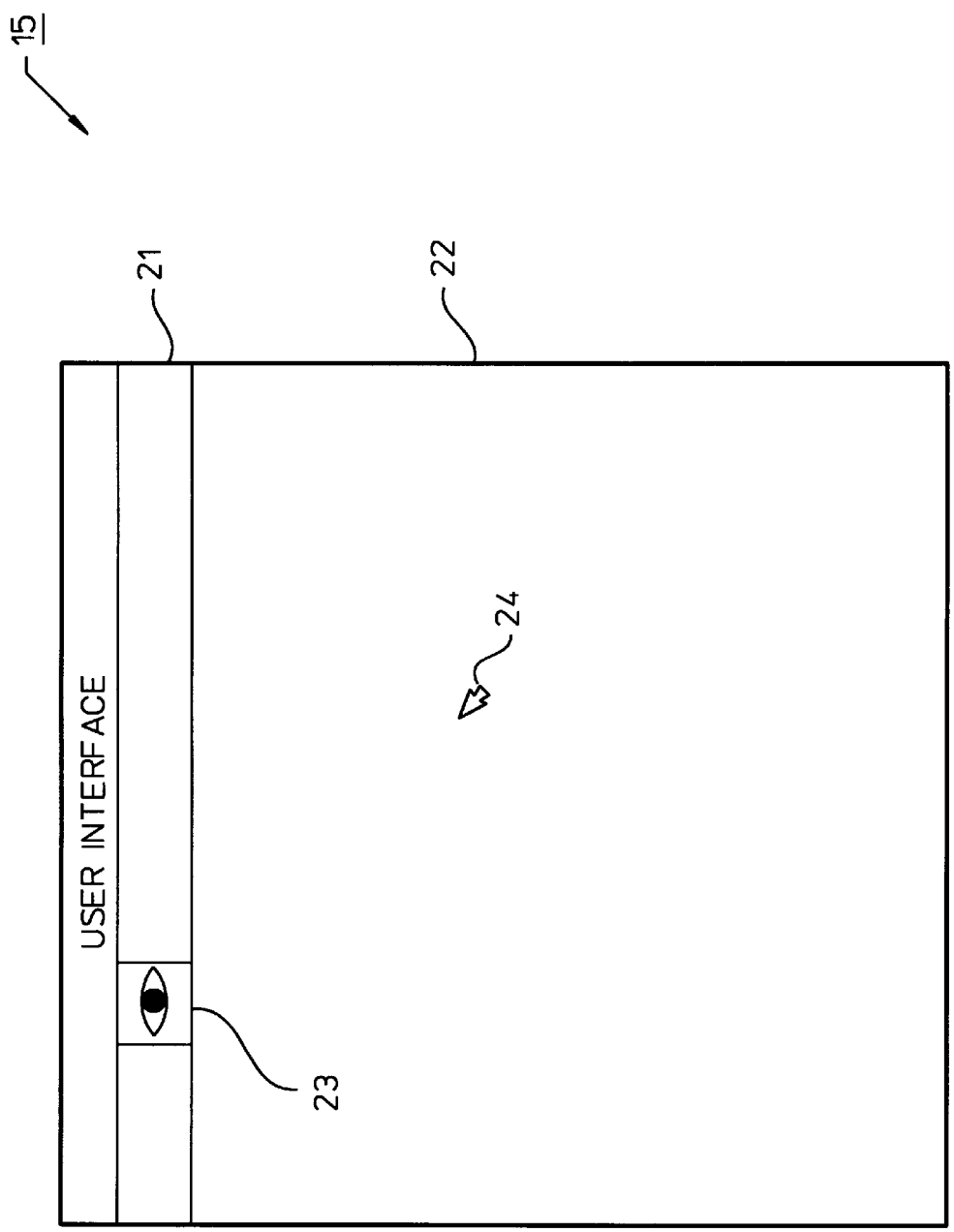
FIG. 2 shows the structure of the user interface.

The user interface 15 of FIG. 1 is displayed on a display (not shown). The display that displays the user interface 15 can be a computer display. The user interface 15 is an interactive interface that allows the user to mark or define an area within the displayed original image 11 (e.g., the marked areas 31 and 32 in FIG. 3) that contains a red eye or red pupil. The user interface 15 also allows the user to activate the red-eye reduction system 10 by placing a cursor on an icon displayed on the user interface 15 using a mouse or other cursor control device and then clicking on the signal button of the mouse or the cursor control device to activate the red-eye reduction system 10. FIG. 2 shows the structure of the user interface 15 which will be described in more detail below.

As can be seen from FIG. 2, the user interface 15 includes a tool bar or menu bar area 21 that includes an icon 23 for activating the red-eye reduction system 10 of FIG. 1. The user interface 15 also includes a display area 22 within which the original image 11 is displayed. The user interface 15 also includes a cursor 24 that allows the user to interact with the user interface 15 through a mouse or other cursor control device (not shown). The cursor 24 also allows the user to define the marked area (e.g., the marked area 31 or 32) of the image 11 displayed. Once the red-eye reduction system 10 is activated through the icon 23, the red-eye reduction system 10 reduces or minimizes the red eye contained in the marked area. The user interface 15 can be implemented using any known user interactive interface technology.

Referring back to FIG. 1, the color image A of the marked area (e.g., the marked area 31 or 32) of the original image 11 is then applied to the masking module 16 of the red-eye reduction system 10. The masking module 16 is used to read the color image A of the marked area and then convert the color image pixel data into a binary mask, which is represented as B=$\{b_{ij}\}$, wherein $b_{ij}$ represents the mask value $b_{ij}$ for a pixel (i, j) within the binary mask B. Because the mask B is a binary mask, each of the pixels $\{b_{ij}\}$ is thus either a "white" pixel or a "black" pixel. This indicates that the binary mask B can be of the same size as the marked area A of the original image 11. Alternatively, the size of the binary mask B is smaller than the marked area A. The binary mask B is used to identify all the red pixels in the marked area A, and therefore is used for the pupil locating module 17 to identify the size and location of the red pupil within the marked area A.

Figure 4:
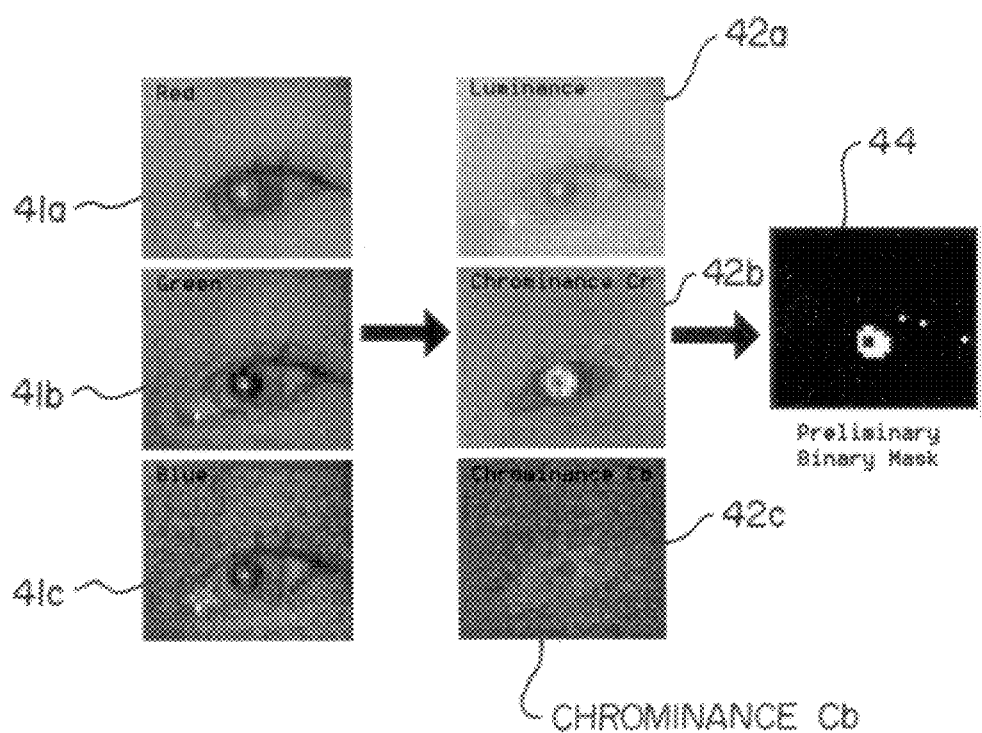
FIG. 4 shows the process of the masking module in converting one defined area into a binary mask that indicates possible location of the red pupil.

The binary mask B includes first state areas or regions that indicate red color pixels in the marked area of the image 11 and second state areas or regions that indicate pixels having colors other than red. The first state areas can be represented by, for example, "white" (i.e., the highest grey scale value) pixels and the second state areas represented by "black" (i.e., the lowest grey scale value) pixels. When the grey scale value is represented by an eight-bit data, the highest grey scale value is 255 and the lowest grey scale value is zero. FIG. 4 shows the converted binary mask 44 of a marked area similar to the area 31 of the original image 11 from the masking module 16, as well as the process of creating the binary mask 44 by the masking module 16, which will be described in more detail below.

As can be seen from FIG. 4, the color image A in the marked area 31 of FIG. 3 is formed by a red image 41*a*, a green image 41*b*, and a blue image 41*c*. The conversion process of the masking module 16 generally includes three steps. First, the masking module 16 converts the images 41*a*–41*c* into a luminance-chrominance representation (i.e., images 42*a*–42*c*). This is done using known techniques. The chrominance information 42*b*–42*c* is then used to calculate a threshold value T between the first state and the second state. Any known threshold determining technique can be used to calculate the threshold T. As is known, a large variety of threshold determining techniques have been devised for image segmentation to distinguish the image foreground from the background or to identify objects in the image.

The threshold value T is then applied to each image pixel of the color image A in the marked area 31 to create the binary mask 44. The masking module 16 can then reduce the size of the binary mask 44 to eliminate areas that are unnecessary and extra for the red-eye reduction within the binary mask 44. This makes the binary mask 44 to only include the red pupil and a predetermined peripheral of the red pupil. Alternatively, this step can be performed before the masking module 16 converts the image of the marked area 31 into the binary mask 44.

In one embodiment, a nonstandard luminance-chrominance representation is employed for the luminance-chrominance representation. In this case, the chrominance information includes a red-green chrominance Cr and a blue-yellow chrominance Cb. Alternatively, other types of luminance-chrominance representation can be used. For example, the luminance-chrominance representation can be a standard luminance-chrominance representation.

As can be seen from FIG. 4, the image 42*a* shows the luminance representation, the image 42*b* shows the chrominance Cr representation and the image 42*c* shows the chrominance Cb representation. The masking module 16 uses a non-linear power function followed by an RGB-to-YCrCb conversion matrix to convert the images 41*a*–41*c* into the images 42*a*–42*c*. The transformation is implemented using known technology.

The RGB represents red, blue, and green color information. Y represents the luminance information and Cr and Cb represent the chrominance information. Before the matrixing operation, the masking module 16 raises each of the RGB values of the image data A of the marked area 31 to the ⅓ power. Since the original RGB data is assumed to have already been gamma-corrected, this gives an effective gamma of about 6.6 to the image data. The purpose of the ⅓ power mapping is to increase the separation between red and non-red pixels.

In one embodiment, the threshold value T is computed by the following equation:

$$T = Cr_{avg} + 0.2 \times (Cr_{max} - Cr_{min})$$

wherein $Cr_{avg}$ represents the average chrominance Cr value, $Cr_{max}$ and $Cr_{min}$ represent the maximum and minimum chrominance Cr values, respectively. The average value, the maximum value, and the minimum value are all computed from the image data A of the marked area 31. Here, the variables Cr and Cb refer to the two chrominance components in the nonstandard luminance-chrominance space. The chrominance component $Cr_{ij}$ for a pixel (i, j) in the marked area 31 is then compared with the threshold value T. If the sum is greater than the threshold value T, the mask value $b_{ij}$ for that pixel (i, j) is one (i.e., white). This means that the color of the pixel (i, j) is red. Otherwise, the mask value of the pixel (i, j) is zero (i.e., black). This results in the binary mask 44, as shown in FIG. 4.

Once the binary mask 44 is constructed, the masking module 16 can use a neighborhood calculation to eliminate isolated red pixels and fill in isolated non-red pixels in the mask 44. Alternatively, the masking module 16 does not perform this step and the pupil locating module 17 performs this step. The neighborhood calculation can be expressed as $$b_{ij} = 1, \text{ if } \sum_{k=i-1}^{i+1} \sum_{m=j}^{j+1} b_{km} > 2 \text{ else, } b_{ij} = 0$$

Figure 5:
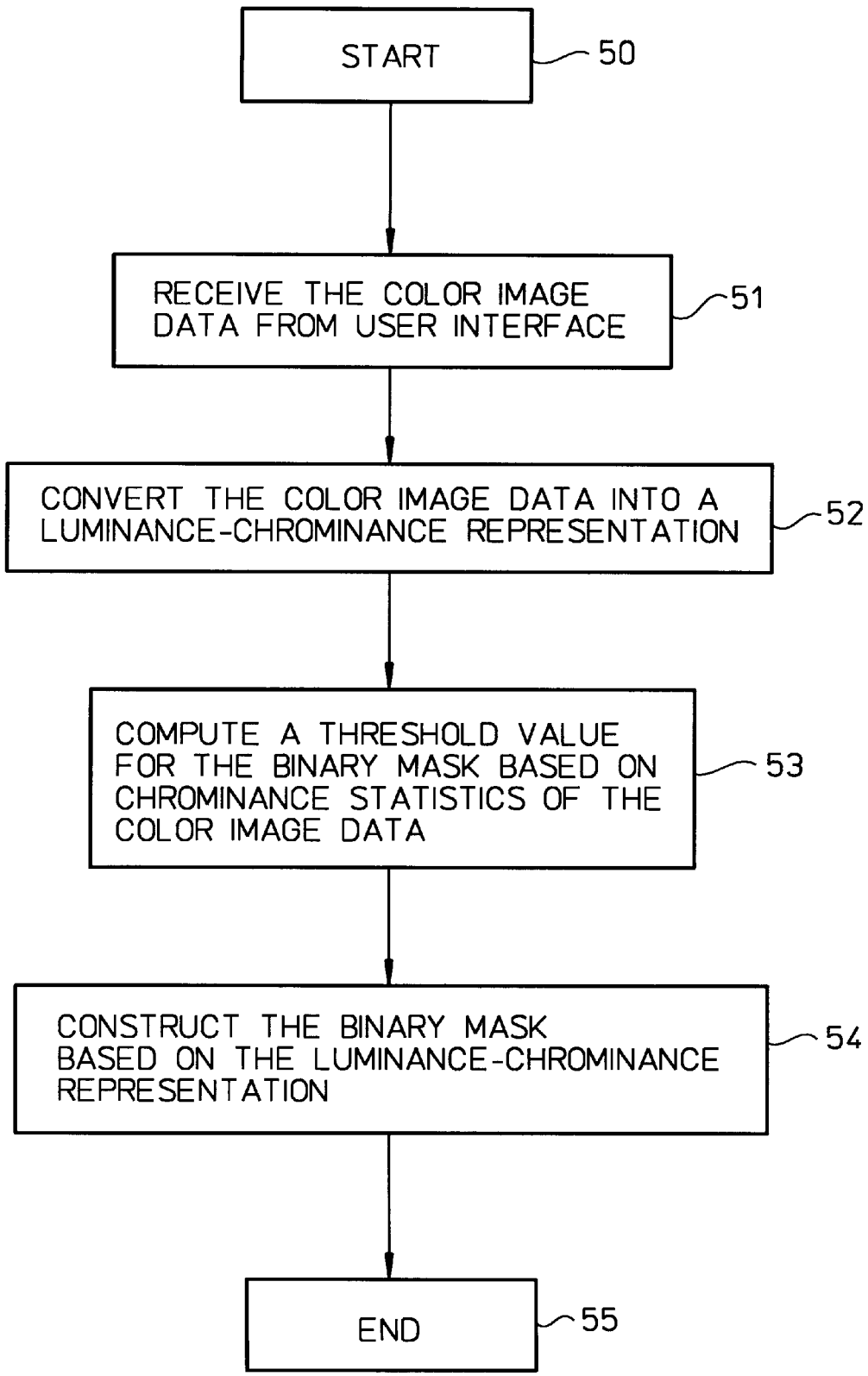
FIG. 5 is the flow chart illustrating the operation of the masking module.
Figure 6:
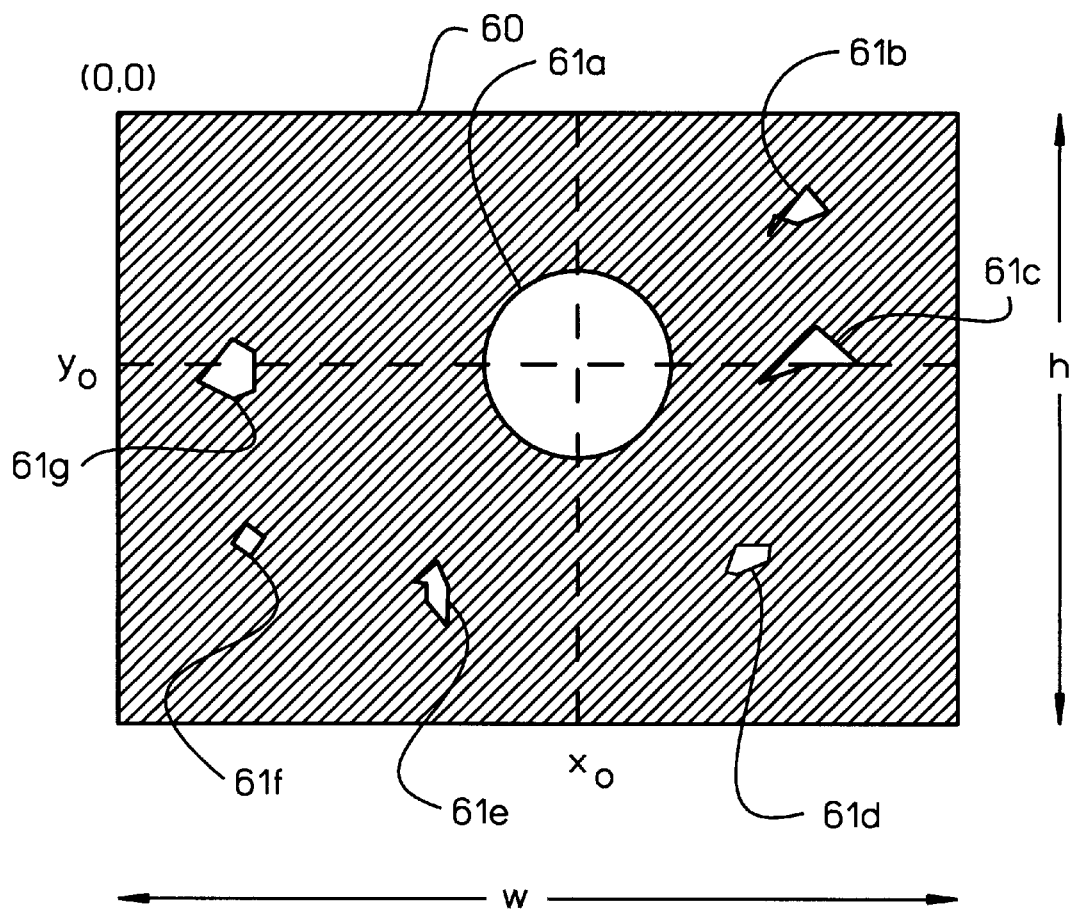
FIGS. 6 and 7 show how the pupil locating module locates the pupil area within a binary mask.
Figure 7:
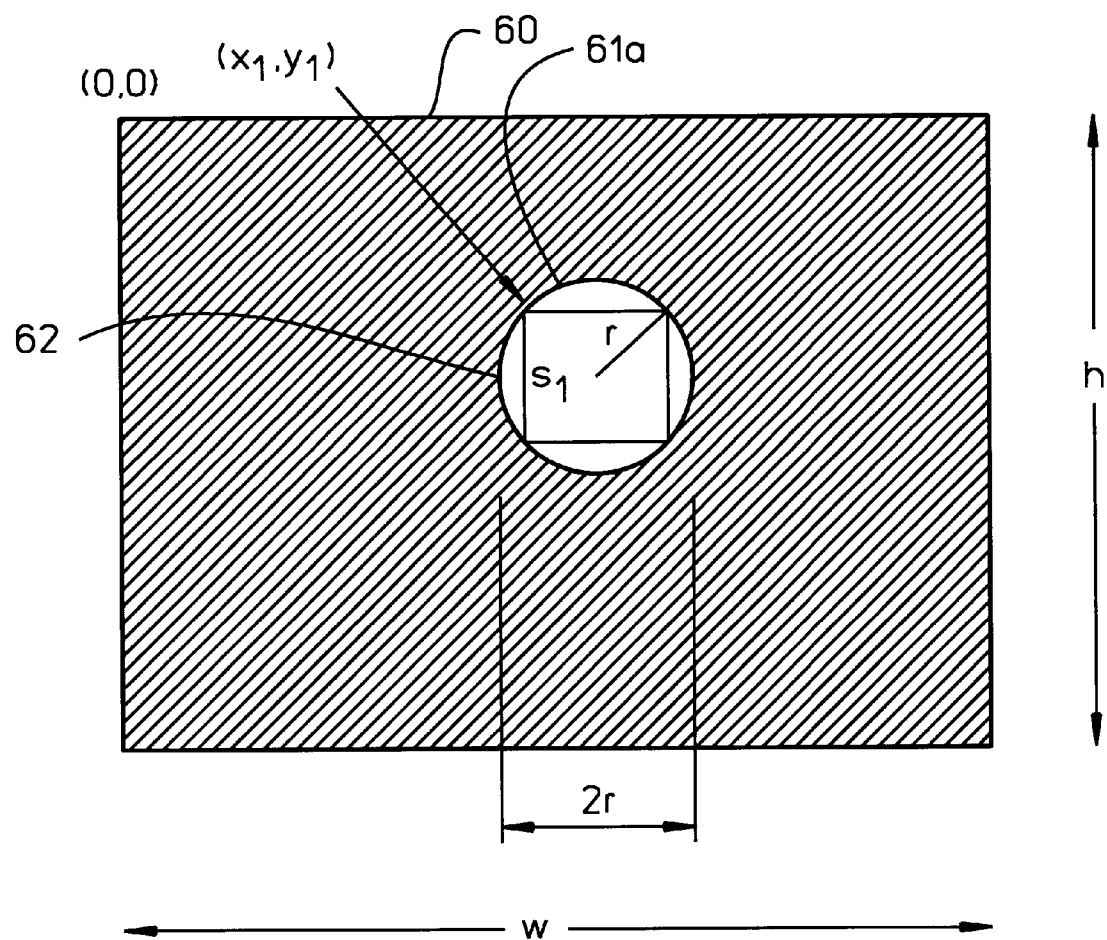

FIG. 5 shows the process of converting the image A of the marked area of the original image 11 into the binary mask B by the masking module 16 of FIG. 1. As can be seen from FIG. 5, the process starts at the step 50. At the step 51, the masking module 16 receives the color image data A from the user interface 15. At the step 52, the masking module 16 uses the RGB-to-YCrCb conversion to convert the color image of the marked area A into the luminance-chrominance representation (e.g., the images 42*a*–42*c*). Then the masking module 16 uses the chrominance information from the luminance-chrominance representation to compute the threshold value at the step 53. At the step 54, the masking module 16 constructs the binary mask B (e.g., the binary mask 44) by comparing each image pixel of the marked area A with the threshold value. The process then ends at the step 55.

Referring back to FIG. 1, the binary mask B from the masking module 16 is then applied to the pupil locating module 17. The pupil locating module 17 processes the binary mask B to locate the red pupil in the image A. The pupil locating module 17 does this by locating a largest "white" area in the binary mask B. This means we assume that the largest white area in the binary mask B is the red pupil. The pupil locating module 17 then generates a modified binary mask $P = \{p_{ij}\}$ from the binary mask B. The modified binary mask P indicates the location of the red pupil in the mask. The modified binary mask P is sent to the color replacing module 18. The modified binary mask P can be a "cleaned up" version of the binary mask B. This means that all other white areas in the binary mask B are converted to black areas as they have nothing to do with the red pupil. Alternatively, the pupil locating module 17 only determines the size and location of the red pupil in the binary mask B and does not modify the binary mask B. In this case, the modified binary mask P is only the binary mask B with location and size information of the red pupil in the mask.

In one embodiment, the pupil locating module 17 employs an exhaustive search and block-matching estimation scheme to locate the largest area in the binary mask B that best matches a white circular area. This exhaustive search scheme searches the entire binary mask B for the largest substantially white area. The exhaustive search scheme will be described in more detail below, also in conjunction with FIGS. 6–7. Alternatively, other schemes may be employed by the pupil locating module 17 to locate the red pupil in the binary mask B. For example, the pupil locating module 17 may employ a tree-search or logarithmic search scheme to locate the red pupil. Moreover, the pupil locating module 17 may apply a Hough transform scheme to locate the red pupil in the binary mask B. Using this scheme, the pupil locating module 17 first detects the outlines or boundaries of the white regions in the binary mask B. Then the pupil locating module 17 uses the Hough transform to detect the presence of a circle among the white regions. The above described schemes are all known schemes and can readily be realized by software programs.

The operation of the pupil locating module 17 is now described in more detail below, also in conjunction with FIGS. 6–9. Suppose that the binary mask B received in the pupil locating module 17 is a w×h binary mask 60 (shown in FIG. 6). In this mask 60, the pixel at the upper left corner is marked as the pixel (0, 0) and the pixel at the lower right corner is marked as the pixel (w−1, h−1). The mask 60 contains several white areas (i.e., white areas 61a through 61g). To locate the largest white area (i.e., the area 61a) in the binary mask 60 that resembles a pupil, the pupil locating module 17 uses a block-matching estimation scheme to determine whether a largest white area in the binary mask 60 better matches the characteristics of a pupil model under a given criterion. As is known, a pupil typically has a circular shape. Thus, a possible pupil model pm can be represented as $\{r, x, y\}$, wherein r is the radius of the circle and (x, y) denote the position of the center of the circle. To simplify the computation, a square pupil model can be used. The square pupil model has parameters $\{s, x, y\}$, wherein s denotes the width of the square and (x, y) denote the position of the left upper corner. The block-matching estimation scheme is a known scheme, and therefore will not be described in more detail.

Using the exhaustive search scheme, the pupil locating module 17 locates the largest white area in the mask 60 that resembles the pupil model in accordance with the following routine.

Let s=min(w, h), $M=-(s^2)$, x and y denote the upper left corner of a square white area. Then perform the following:

```
do {
    M_old = M
    for y = 0 to y = h−s
        x = 0 to x = w−s
            Find the s × s white area with the maxinium number of
            white pixels n.
            M = 2 × n − s²
            if M > M_old
                then make the white area as the best pupil model.
    s = s − 1
} while M > M_old.
```

This can be shown to yield the best match in the maximum likelihood sense.

Figure 8:
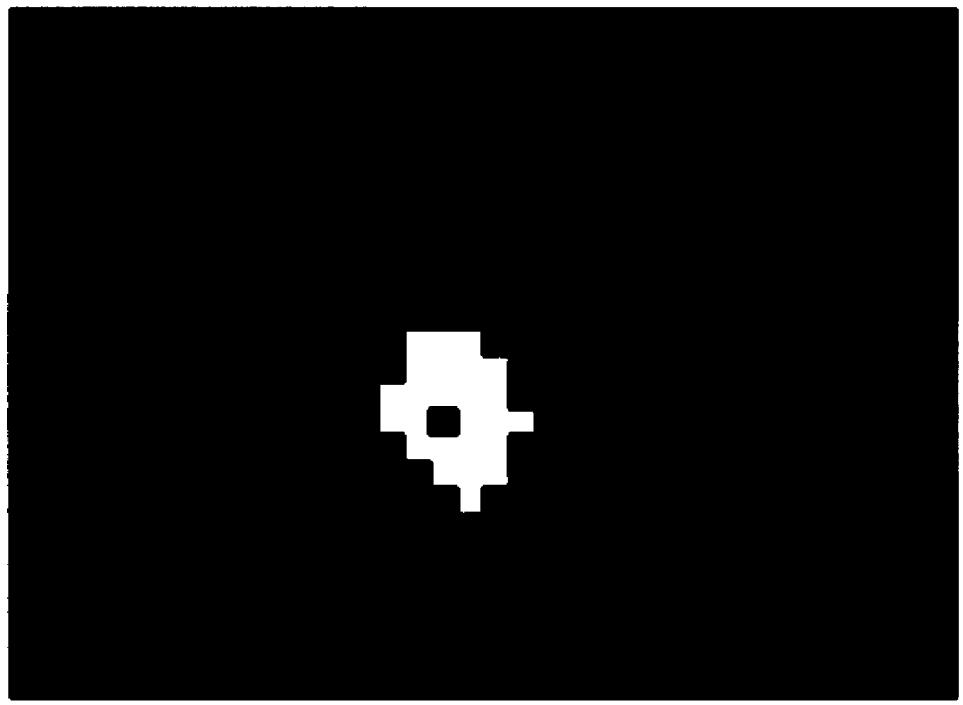
FIG. 8 shows the binary mask of FIG. 4 after being processed by the pupil locating module.

Once the pupil locating module 17 determines the square parameters $\{s, x, y\}$ of the largest white area, the circular parameters $\{r, x, y\}$ of that area can then be determined. This can be seen from FIG. 7, which shows the square 62 located by the pupil locating module 17 within the white area 61a of the mask 60. As can be seen from FIG. 7, when the parameters $\{s_1, x_1, y_1,\}$ of the square 62 are determined, the circular parameters of the white area 61a can be given as $\{r, x_0, y_0,\}$, wherein r represents the radius and $x_0$ and $y_0$ denote the center of the circle. In this case, r is equal to $s_1/\sqrt{2}$, $x_0$ is equal to $x_1+s_1/2$, and $y_0$ is equal to $y_1+s_1/2$. Alternatively, r can be made to equal to $s_1/2$. FIG. 8 shows a modified binary mask 80 generated by the pupil locating module 17 from the binary mask 44 of FIG. 4.

Figure 9:
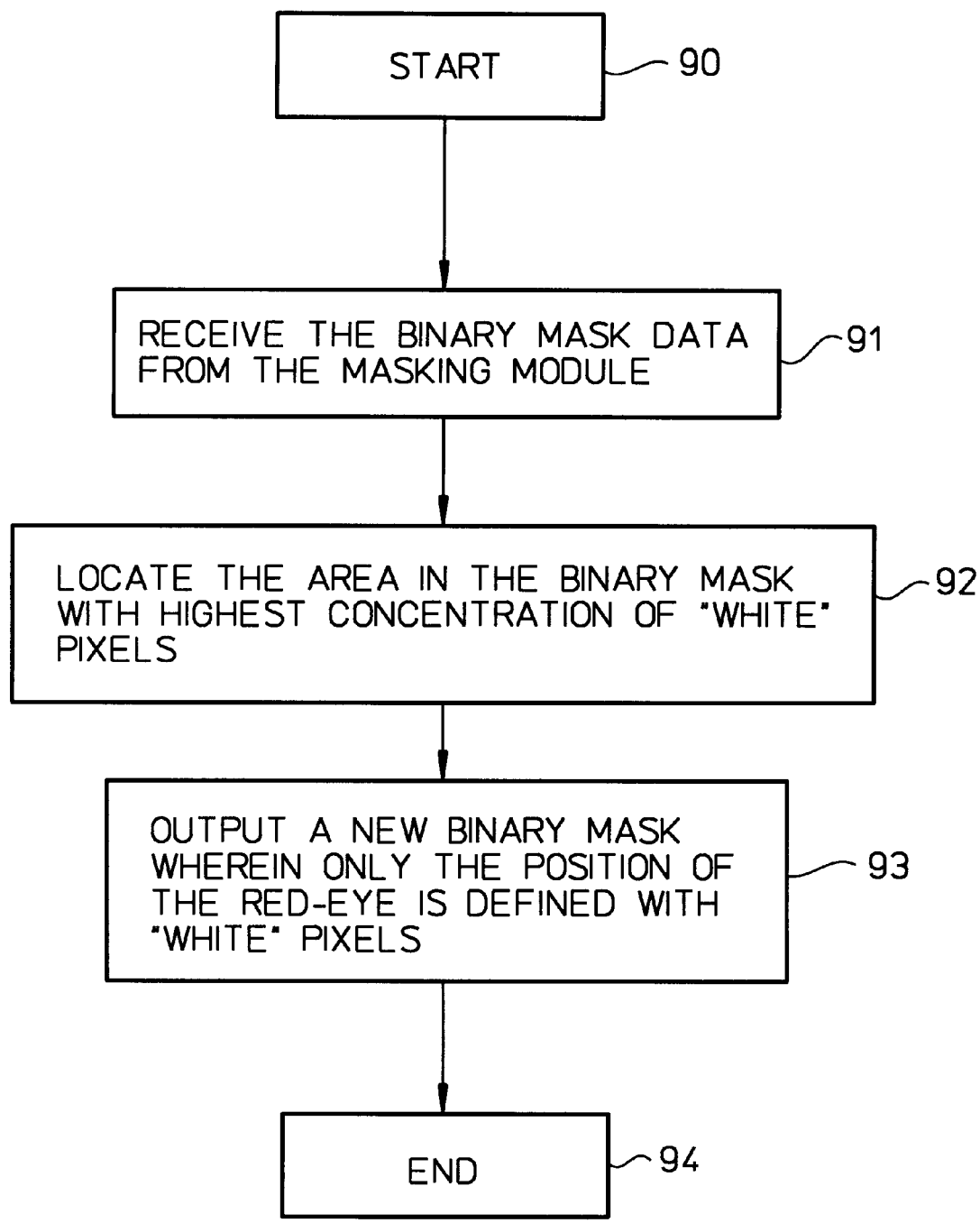
FIG. 9 is the flow chart illustrating the operation of the pupil locating module.

FIG. 9 shows the main steps of the pupil locating module 17 to locate the location and size of the red pupil in the binary mask B. As can be seen from FIG. 9, the process starts at the step 90. At the step 91, the pupil locating module 17 receives the binary mask B from the masking module 16. At the step 92, the pupil locating module 17 locates the location of the red pupil in the mask by locating the largest "white" area in the mask B. At the step 93, the pupil locating module 17 outputs the modified binary mask P where only the white pixels of the area found in the step 92 remain white. The remaining pixels in the binary mask P are changed to black. The process ends at the step 94.

Referring back to FIG. 1, the color replacing module 18 is used to replace the red color pixels within the white area that resembles a pupil in the modified binary mask P into monochrome (grey) or other predefined colors. The binary mask P has a substantially white area which is determined by the pupil locating module 17 as the red pupil. This area may include a black island (see FIG. 8) that indicates the glint of the eye. The color replacing module 18 only replaces colors of the pixels for which the mask value $p_{ij}=1$. In this way, the glint of the pupil is maintained (the glint is a bright spot in the pupil). The glint is shown in the binary mask B or P as a "black" island surrounded by white pixels. In one embodiment, the color data is changed so the chrominance values of all the "white" pixels become zero. In addition, the color replacing module 18 also changes the luminance value of all pixels within the white area by a predetermined factor value. In one embodiment, this factor value is approximately 0.8.

In addition, because a red pupil typically has a pink colored region or ring outside the red pupil, it is desirable to change the color of those pink pixels to maintain a natural appearance of the eye after the color of these red pupil pixels has been changed. However, because the color of these pink color pixels is not red enough, they are not converted into the "white" pixels by the masking module 16 in the binary mask B. Thus, the color replacing module 18 needs to "grow" the white area in the modified binary mask P in order to cover these pink color pixels. This is also referred to as boundary adjustment.

To accomplish the boundary adjustment, the color replacing module 18 analyzes the color of all adjacent pixels in the image A that are outside the white area in the modified binary mask P, but each of which has at least one neighboring pixel within the white area. The color replacing module 18 analyzes the color of adjacent pixels to determine if their color is sufficiently close to red. This closeness indicates a deviation in perceived redness. The color replacing module 18 does this by comparing the color value of an adjacent pixel with the median red value $r_{med}$ of all the pixels within the white area of the binary mask P. The color of the adjacent pixel is also compared with the difference of the median red value $r_{med}$ and the median green value $g_{med}$ all the pixels within the white area. By using the median values $r_{med}$ and $g_{med}$, the glint information within the white area is effectively avoided so long as the glint pixels do not dominate the white area. Alternatively, average red and green values can be used instead of median values.

In one embodiment and as a measure of perceived change in redness, two quantities are used for the comparison. One is the percent deviation of the red value of the adjacent pixel $a_{ij}$ with respect to the median red value $r_{med}$, which is denoted $\eta^r_{ij}$. Thus, $\eta^r_{ij} = |r_{aij} - r_{aij}|/r_{med} \times 100\%$. $r_{aij}$ indicates the red value of the adjacent pixel $a_{ij}$ The other quantity is the percent deviation in red-green difference, which is denoted as $\eta^{r-g}_{ij}$. Thus, if we define $\Delta^{rg}_{ij} = |r_{aij} - g_{aij}|$ and $\Delta^{rgm} = |r_{med} - g_{med}|$, then $\eta^{r-g}_{ij}$ is equal to $|\Delta^{rg}_{ij} - \Delta^{rgm}|/\Delta^{rgm} \times 100\%$. When both $\eta^r_{ij}$ and $\eta^{r-g}_{ij}$ are below certain predetermined threshold values, the color of the adjacent pixel $a_{ij}$ is determined to be sufficient close to red and the pixel be included in the white area.

In one embodiment, the threshold value $TH_r$ for $\eta^r_{ij}$ is approximately thirty and the threshold value $TH_{r-g}$ for $\eta^{r-g}_{ij}$ is approximately forty. Alternatively, different threshold values can be employed for the two measurements.

As all the adjacent pixels to the white area are analyzed, the results are stored in a second mask P'. A value $p'_{ij}=1$ indicates that the pixel $a_{ij}$ should be included in the white area of P, while a zero value means it should not. After the mask P' is constructed, the two binary mask areas P and P' are merged to form a new version of P. This process can be repeated N times, wherein N is a predetermined number (e.g., 5). The value of N dictates how far the white area of P can grow in attempting to make it conform to the actual shape of red pixels within the red pupil. The region growing process of the color replacing module 18 is expressed in pseudo-code as:

```
initialize all p'_ij = 0
for (k = 0; k < N; k++){
    for (all pixels a_ij bordering {p_ij} = 1){
        compute η^r_ij;
        Compute η^r-g_ij;
        If ((η^r_ij < TH_r) AND (η^r-g_ij < TH_r-g)
            p'_ij = 1;
    }
    for (all ij)
        p_ij = p_ij OR p'_ij;
} wherein the OR is a binary operator.
```

Figure 10:
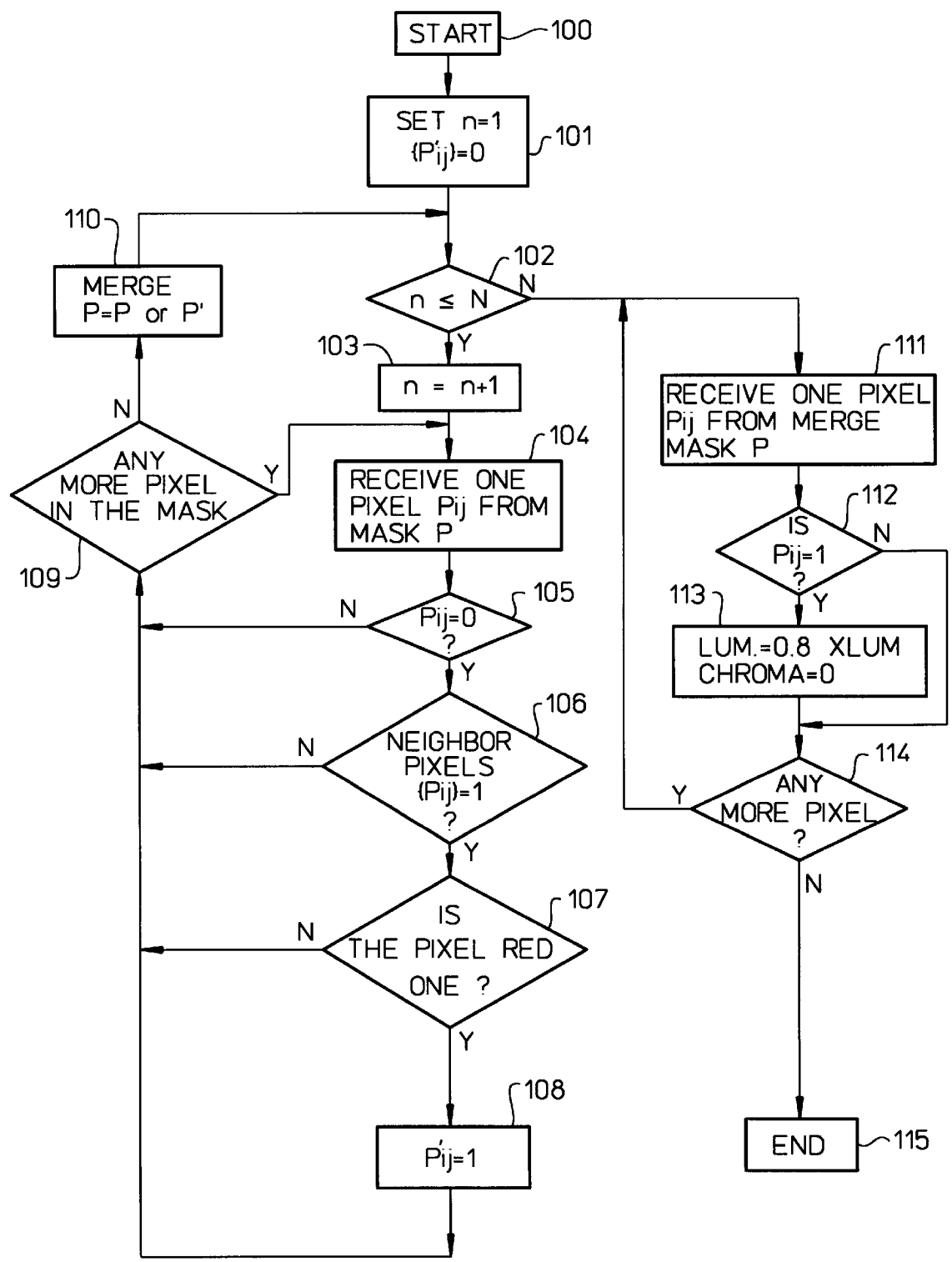
FIG. 10 is the flow chart showing the operation of the color replacing module.

FIG. 10 shows the process of the color replacing module 18. As can be seen from FIG. 10, the process starts at the step 100. The step 101 is an initialization step at which the variable n is set to one and the mask P' is set to zero. At the step 102, n is compared with the predetermined number N. If n is greater than N, then the step 111 is performed. Otherwise, the step 103 is performed at which n is incremented. At the step 104, the color replacing module 18 receives one pixel $p_{ij}$ from the mask P. Then the step 105 is performed to determine if the pixel is a "black" pixel (i.e., $p_{ij}=0$). If not, the step 109 is performed. If the answer is positive, then the color replacing module 18 checks if any neighboring pixel of the pixel is a "white" pixel in the mask P at the step 106. If not, the step 109 is the next step. Otherwise, the step 107 is performed to determine if the color of the pixel $a_{ij}$ is sufficiently red. If not, the step 109 is the next step. Otherwise, the color replacing module 18 grows the white area in the modified mask P by marking the pixel $p'_{ij}$ as a "white" pixel at the step 108.

At the step 109, the color replacing module 18 determines if all pixels within the mask P have been checked. If not, then the step 104 is repeated. If so, the step 110 is the next step at which the masks P and P' are merged by a binary OR operation into a newer version of P. The process then returns to the step 102.

If, at the step 102, it is determined that n is greater than N, the step 111 is performed at which the color replacing module 18 receives one pixel $p_{ij}$ from the newer version of P. Then the step 112 is performed to determine if the pixel is a "white" pixel (i.e., $p_{ij}=1$). If not, the step 114 is performed. If the answer is positive, then the color replacing module 18 changes the color of the pixel to monochrome (grey) or other predefined colors at the step 113. In one embodiment, this is done by changing the luminance and chrominance values of the pixel. The luminance value can be changed, for example, by a 0.8 factor and the chrominance values can be set to zero. Then the step 114 is performed at which the color replacing module 18 determines if all of the pixels within the newer version of P have been checked. If so, the process ends at the step 115. If no, the step 111 is repeated.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A red-eye reduction system, comprising:
   (A) a masking module that converts an image into a mask having first state areas representing red color pixels and second state areas representing other color pixels, wherein the image includes an eye with a red pupil;
   (B) a pupil locating module coupled to the masking module to locate a substantially first state area in the mask that resembles a pupil by determining if the substantially first state area is a substantially largest first state area within the mask, wherein determining that substantially first state area resembles a pupil, the pupil locating module modifies the mask by changing all other first state areas in the mask into second state such that the modified mask only has the substantially first state areas;
   (C) a color replacing module coupled to the pupil locating module to change the red color pixels in the area into a predetermined color, wherein the color replacing module also adjust boundary of the area by changing the colors of pixels in close proximity to the, area to the predetermined color if the color of these pixels is determined to be sufficiently close to red.

2. The red-eye reduction system of claim 1, wherein the substantially first state area includes a second state area within the first state area, wherein the second state area represents the glint in the pupil.

3. The red-eye reduction system of claim 2, wherein the predetermined color is a zero chrominance, wherein the color replacing module also changes the luminance value of all pixels within the substantially first state area by a predetermined factor.

4. The red-eye reduction system of claim 1, wherein the masking module converts the image into the mask by first raising red-green-blue values of the image to a predetermined power and then performing a standard luminance-chrominance conversion.

5. The red-eye reduction system of claim 1, wherein the color replacing module determines if the color of the adjacent pixel is sufficiently close to red by comparing the color value of the adjacent pixel with (i) a median red value and (ii) a median green value of all the red color pixels within the substantially first state area.

6. The red-eye reduction system of claim 1, wherein the adjacent pixel is a pixel that has at least one neighboring pixel in the substantially first state area.

7. A method of reducing red-eye effect in a digital image, comprising:

(A) converting an image having an eye with a red pupil into a binary mask having first state areas representing red color pixels of the image and second state areas representing other color pixels of the image, wherein the image includes an eye with a red pupil;

(B) processing the mask to locate a substantially first state area in the mask that resembles a pupil, (C) changing the red color pixels in the area into a predetermined color with boundary adjustments such that the color of pixels in close proximity to the area is also changed to the predetermined color if the color of these pixels is determined to be sufficiently close to red other comprising (a) determining if the adjusted pixel outside the substantially first state area is a pixel that has at least one neigh-boring pixel within the substantially first state area;

(b) if so, comparing the color value of the adjusted pixel with (i) a median red value and (ii) a median green value of all tile red color pixels within the substantially first state area to determine if the color of the adjusted pixel is sufficiently close to red, wherein the color value of the adjusted pixel is determined to be sufficiently close to red if the color value of the adjusted pixel varies from the median red value by less than a first predetermined value and the red-green color difference of the adjusted pixel varies from the difference between the red Median value and the green median value by less than a second predetermined value;

(c) if so, changing the color of the adjacent pixel to the predetermined color.

8. The method of claim 7, wherein the step (B) further comprises the steps of (I) determining if the substantially first state area is a largest substantially first state area in the mask;

(II) determining if the substantially first state area is substantially circular;

(III) modifying the mask by changing all other first state areas in the mask into second state such that the modified mask only has the substantially first state area.

9. The method of claim 7, wherein the substantially first state area includes a second state area within the first state area, wherein the second state area represents the glint in the pupil.

10. The method of claim 7, wherein the step (C) further comprises the steps of (a) changing the color of the red color pixels within the substantially first state area to the predetermined color by setting the chrominance of the red color pixels to zero;

(b) changing the luminance value of all pixels within the substantially first state area by a predetermined factor.

11. The method of claim 7, wherein the step (A) further comprises the steps of (a) raising red-green-blue values of the image to a predetermined power;

(b) performing a standard luminance-chrominance conversion;

(c) creating the mask.

* * * * *